United States Patent [19]

Emich, deceased et al.

[11] 4,015,022
[45] Mar. 29, 1977

[54] METHOD OF REDUCING THE CONTENT OF IRRITANT SUBSTANCES IN COFFEE

[75] Inventors: Peter A. W. Emich, deceased, late of Hamburg, Germany; by Edith G. H. Emich nee Leirmann, Hamburg, Germany; by Peter-Michael Emich, Hamburg, Germany; by Ulrich Emich, Hamburg, Germany; by Barbara Emich, heirs, Hamburg, Germany

[73] Assignee: Kaffee-Veredelungs-Werk Koffeinfrei Kaffee GmbH & Co., Hamburg, Germany

[22] Filed: July 18, 1975

[21] Appl. No.: 597,074

Related U.S. Application Data

[63] Continuation of Ser. No. 340,665, March 13, 1973, abandoned.

[30] Foreign Application Priority Data

Mar. 14, 1972 Germany .................... 2212171

[52] U.S. Cl. .................. 426/460; 426/432; 426/461; 426/472; 426/486; 426/595
[51] Int. Cl.² .......................... A23F 1/04
[58] Field of Search .......... 426/460, 432, 461, 472, 426/486, 506, 507, 511, 595

[56] References Cited

UNITED STATES PATENTS

| | | | |
|---|---|---|---|
| 978,866 | 12/1910 | Evers | 426/461 X |
| 2,278,473 | 4/1942 | Musher | 426/461 X |
| 2,712,501 | 7/1955 | Hale et al. | 426/507 X |
| 3,088,825 | 5/1963 | Topalian et al. | 426/461 X |
| 3,420,674 | 1/1969 | McCartney | 426/472 |
| 3,767,418 | 10/1973 | Ponzoni et al. | 426/461 |

FOREIGN PATENTS OR APPLICATIONS 576,515  4/1933  Germany .................... 426/461

OTHER PUBLICATIONS

"The Digestibility of Various Types of Coffee" by K. Mulhens M.D. and L. Graf-Rieckman phD, printed in "Deutsche Lebenensmittel Runschav," 1967, a German Publication, (translation included).

Primary Examiner—Frank W. Lutter
Assistant Examiner—N. Greenblum
Attorney, Agent, or Firm—H. Dale Palmatier

[57] ABSTRACT

Raw coffee is heated up by humidified hot air during a first period, then cooled at a reduced pressure during an immediately following second period, and these alternate treatments are carried out several times in succession.

4 Claims, 1 Drawing Figure

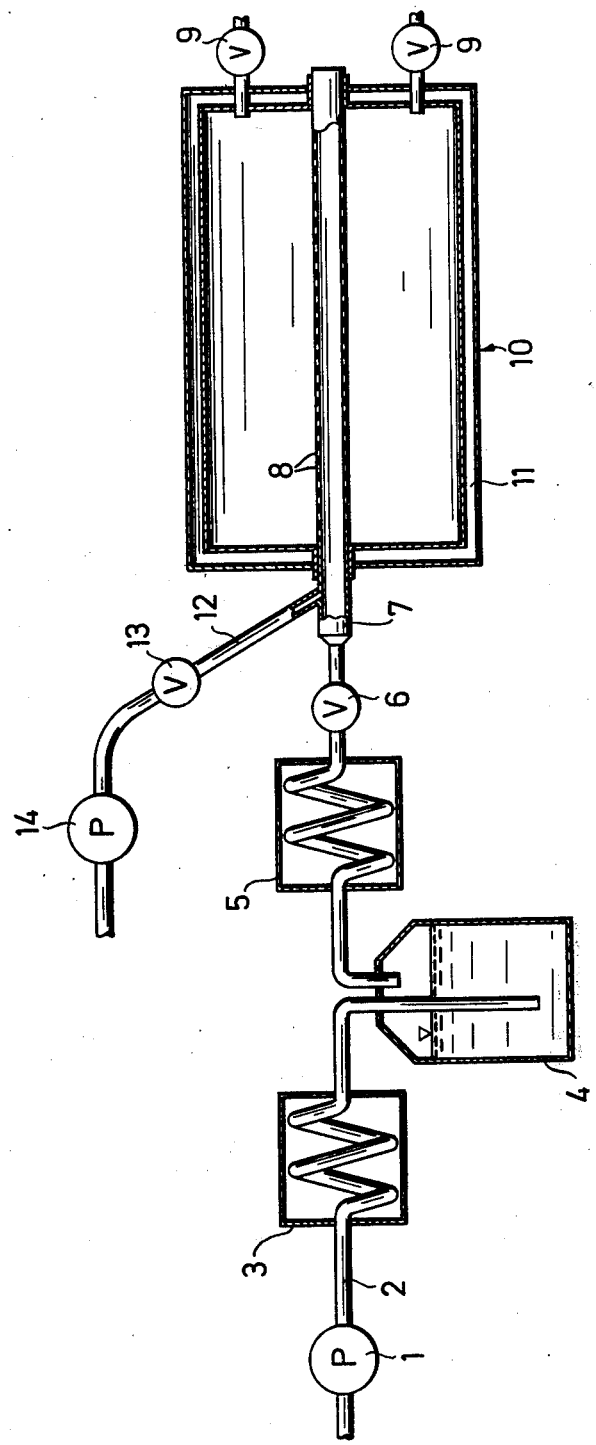

METHOD OF REDUCING THE CONTENT OF IRRITANT SUBSTANCES IN COFFEE

This application is a continuation of U.S. application Ser. No. 340,655 filed Mar. 13, 1973, now abandoned.

The present invention relates to a method of reducing the content of irritant substances in coffee by high temperature treatment, and an apparatus therefor.

As far as presently understood in the art to which the present invention relates there are believed to exist mainly two groups of substances which affect the digestibility of coffee. These two groups may be classified into a. ether soluble irritant substances, and
b. hydroxy tryptamides.

In a well known prior art method the content of these substances in coffee is reduced by initially washing the raw coffee in organic solvents such as a chlorohydrocarbon to remove the wax-like layer containing the hydroxy tryptamides from the surface of the coffee beans. Chlorohydrocarbons are likewise employed to extract coffein from raw coffee. After washing the raw coffee in an organic solvent the thus treated coffee beans are exposed to steam, optionally at an overpressure, to again remove the organic solvent employed in the previous washing step, since solvents of this type are not allowed in foodstuffs. This steam treatment accomplished at the same time a reduction of the concentration of ether soluble irritant substances.

Since consumers nowadays tend more and more towards a "healthy nourishment" it may be considered advantageous to treat the coffee with the view of obtaining a better digestibility, or in other words to reduce the content of irritant substances in the coffee without having recourse to a washing step by means of solvents. Experts in this field unanimously believe that the content of hydroxy tryptamides may be reduced in any substantial degree only by washing the coffee in an organic solvent.

It is therefore an object of the present invention to provide a novel and improved method of reducing the content of irritant substances in coffee.

It is another object of the present invention to provide a method of the above type which allows to reduce with maximum efficiency not only the content of ether soluble irritant substances but likewise the content of hydroxy tryptamides in coffee.

It is another object of the invention to provide a method of the above type which allows to improve upon the digestibility of coffee by reducing the content of irritant substances contained therein, and this without a treatment by means of an organic solvent.

It is a further object of the invention to provide an apparatus for reducing the content of irritant substances in coffee.

In accordance with the present invention there is now defined a method of reducing the content of irritant substances in coffee by means of a high temperature treatment wherein the high temperature treatment is effected by means of hot air of a relatively high humidity, and this treatment is followed by a cooling step at a reduced pressure.

In practice, the high temperature treatment with hot air of a relatively high humidity and the following cooling treatment at a reduced pressure are carried out several times successively.

Surprisingly, it has been found that the above described treatment allows to reduce the content of irritant substances in coffee without employing any organic solvent. In the method of the present invention the reduction of ether soluble irritant substances and of hydroxy tryptamides is in quantitative aspects at least comparable or even superior to prior art methods.

For practicing the present invention there is suitably employed an apparatus comprising a rotatably journalled barrel having an inner wall and an outer wall, means for rotating the barrel, perforated tubular means disposed axially of the barrel, conduit means and valve means connected to the barrel, a vacumm source adapted to be connected with the interior of the barrel and means for supplying hot air of a relatively high humidity to the barrel. This apparatus allows to alternately treat the coffee with hot humid air and to cool the coffee at a reduced pressure. The coffee disposed in the interior of the barrel is continuously agitated in thus ensuring an even treatment of the coffee beans. The double walled barrel design allows to control the temperature within the barrel by supplying to the annular space between inner and outer walls of the barrel a heating fluid such as steam and a cooling fluid such as water of a predetermined temperature.

Preferably the barrel is rotatably journalled on a perforated tubular shaft which simultaneously serves to alternately supply hot humid air to the barrel or to apply a vacuum thereto.

In the appended drawing, a preferred embodiment of the apparatus for practicing the present invention is schematically illustrated.

Referring to the drawing, a barrel 10 which may be of any suitable cross-sectional shape is rotatably journalled about a hollow tubular shaft 7. The barrel 10 is provided with one or several openings (not shown) for charging and removing coffee beans from the barrel. The openings are adapted to be closed by suitable lids or covers (not shown). The barrel 10 comprises an inner wall and an outer wall defining an intermediate annular space 11 therebetween. A tubular shaft 7 extends axially through the barrel and is provided with a plurality of perforations 8 along the shaft portion inside the barrel. The interior of the barrel may be selectively connected to ambient air by means of a pair of valves 9.

A conduit connected to the interior of the tubular shaft 7 includes a pump 1 sucking in ambient air and discharging a stream of compressed air through a line 2 into a heat exchanger 3. The compressed air passes through the heat exchanger 3 and is thereby heated up. After leaving the heat exchanger 3 the air is passed through several wash liquid containers 4 connected in series of which for simplicity one container only is shown in the schematical drawing. The air discharged from the series of wash liquid containers 4 passes through a second heat exchanger 5 in which the air is heated up to a desired final temperature. From the second heat exchanger 5 the air passes through a valve 6 into the tubular shaft 7, and from the shaft 7 into the interior of the barrel.

The tubular shaft is also connected to a vacuum source 14 through a line 12 and a valve 13.

During the treatment of coffee disposed in the interior of the barrel with hot humid air the valve 6 is open and the valve 13 is closed. Simultaneously the pump 1 operates and supplies hot humidified air into the interior of the barrel 10 whereas the vacuum pump 14 is switched off or on standby operation. Together with the hot air treatment the cavity 11 between inner and outer walls of the barrel 10 is heated up by means of steam supplied thereto (not shown).

For cooling the coffee beans inside the barrel, at a reduced pressure, immediately upon completion of the hot humidified air treatment the valve 6 is closed and the valve 13 is opened, and simultaneously the vacuum pump 14 is put into operation. The cavity 11 of the barrel 10 is then filled with water having a predetermined temperature, in order to achieve a desired cooling effect. For this purpose, the cavity 11 is connected through suitable fittings with a water source (not shown). During the cooling step at a reduced pressure the valves 9 are closed.

In a test procedure, the actual test conditions were as follows:

1. Air saturated with water and at a temperature of about 248° F. was heated up to about 257° F. in the heat exchanger 5 and then pumped into the barrel 10 which was continuously rotated at a speed of substantially 10 rotations per minute. The barrel 10 contained a certain quantity of raw coffee. Simultaneously the barrel wall was heated up by steam to a temperature of about 239° F. Since the walls of the barrel and the surfaces of the beans were at a lower surface temperature than the temperature of the air supplied into the barrel these surfaces were at a somewhat lower temperature than the dew point of the air so that the resulting condensed out water was adsorbed by the coffee beans. This hot air treatment was continued for about 30 minutes, and then the hot air supply was stopped. 2. Upon termination of the hot air supply the valves 9 were closed and the vacuum pump 14 was connected to the barrel 10 until the vacuum in the continuously rotating barrel reached a final value of substantially 100 mms Hg. During a period of 10 to 15 minutes the temperature of the barrel wall was simultaneously reduced to about 104° F. The vacuum treatment period was likewise adjusted to about 30 minutes.

3. Following the vacuum treatment the barrel was again vented, i.e. connected to ambient air, the barrel cavity 11 heated up by steam and simultaneously hot humidified air was supplied during about 30 minutes as described above under step (1).

4. After the hot air treatment as described under step (3) above the coffee was again cooled at a reduced pressure as described above under (2).

5. The alternate hot air/vacuum treatment of the coffee was altogether repeated six times.

The method of the present invention allows to reduce the content of ether soluble irritant substances in coffee by 40 to 50 percent. Additionally, the amounts of hydroxy tryptamides which may be analytically measured may be distinctively reduced.

The method may be further illustrated by the following example:

100 gr. Guatemala raw coffee were filled into a horizontally mounted glass tube forming in the present example the barrel 10 and having a diameter of 3.937 in. and a length of 7.87 in. The barrel is rotated by means of friction wheels at a speed of 10 rpm. Several horizontal glass rods are fused to the inner surfaces of the barrel walls and serve as agitating means for the coffee so that the coffee beans disposed in the barrel (i.e. inside the glass tube) continuously perform a tumbling movement.

The pump 1 pumps ambient air through a copper coil (serving as the heat exchanger 3) which is immersed in a hot oil bath having a temperature of about 248° F. The air heated up to about 248° F. is then passed through wash liquid containers 4 which are immersed in a hot oil bath of a temperature of about 248° F. and each contain a supply of water. Five wash liquid containers are employed and are connected in series.

At the end of the series of wash liquid containers is connected a valve designed to open at a pressure of 29.8 psig. When this pressure is reached or exceeded the hot humidified air passes through a second copper coil (serving as the heat exchanger 5) which is immersed in a hot oil bath of a temperature of about 257° F. so that upon passing through this coil the air is heated to exactly this temperature. In this manner any condensation is prevented. The further process steps are identical to the ones described above.

The content of ether soluble irritant substances in the raw coffee was initially 0.47 gr irritant substances in 10 gr. of coffee, and after treatment according to the method of the present invention was reduced to 0.20 gr. irritant substances in 10 gr. of coffee. The content of hydroxy tryptamides in the raw coffee amounted to 920 PPM, and after treatment according to the method of the invention was merely 260 PPM.

The mechanical treatment in the rotating barrel produces the welcome result that the so-called "silver skins" which become detached from the beans during the hot air treatment are almost fully stripped from the coffee beans.

I claim:

1. A method of reducing the content of hydroxy tryptamides and ether soluble irritant substances in raw coffee to improve digestibility, the method comprising repeatedly first heating followed by cooling of the coffee, the heating treatments comprising continuously passing a stream of hot, humid air at about 257° F through a quantity of such coffee with the coffee maintained below the dew-point of the hot, humid air and moisture condensing on the coffee, and the cooling treatments comprising subjecting the raw coffee to cooling to about 104° F while concurrently subjecting the raw coffee to subatmospheric pressure.

2. The method as defined in claim 1 wherein the cooling progresses while the pressure is reduced to a final vacuum of about 100 mms Hg.

3. The method as defined in claim 1 wherein said heating and cooling treatments are carried out within an enclosure with agitation of the raw coffee in the enclosure during both the heating and cooling treatments, and wherein said hot air has a sufficiently high humidity as to be saturated at about 248° F., and the wall of the enclosure is at about 239° F. during the heating treatment.

4. The method as defined in claim 1, wherein the heating treatment is carried out in a revolving barrel producing continuous agitation, with the humid air at a temperature of about 257° F. and for a time period of about 30 minutes, the temperature of the wall of the barrel being less than the dew-point of the humid hot air; and wherein the cooling treatment at reduced pressure is carried out to a final vacuum of about 100 mms Hg and the barrel wall temperature decreasing to about 104° F.

* * * * *